April 1, 1924.  
E. E. VINING ET AL  
TRAP  
Filed April 17, 1922    2 Sheets-Sheet 1  
1,488,769

E. E. Vining  
E. R. Clodfelter  
Inventors

By C. A. Snow & Co.  
Attorney

April 1, 1924.

E. E. VINING ET AL 1,488,769

TRAP

Filed April 17, 1922

2 Sheets-Sheet 2

E. E. Vining
E. R. Clodfelter
Inventors

By C. A. Snow & Co.
Attorney

Patented Apr. 1, 1924.

1,488,769

UNITED STATES PATENT OFFICE.

EDWIN EARL VINING AND RUFUS EUPHRATES CLODFELTER, OF UTICA, KANSAS.

TRAP.

Application filed April 17, 1922. Serial No. 553,374.

*To all whom it may concern:*

Be it known that we, EDWIN EARL VINING and RUFUS E. CLODFELTER, citizens of the United States, residing at Utica, in the county of Ness, State of Kansas, have invented a new and useful Trap, of which the following is a specification.

The device forming the subject matter of this application is a trap, and the invention aims to provide a trap so constructed that the animals will be dropped downwardly into the body of the trap, novel means being provided for exposing the bait, and novel means being provided for holding the swinging platforms releasably.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
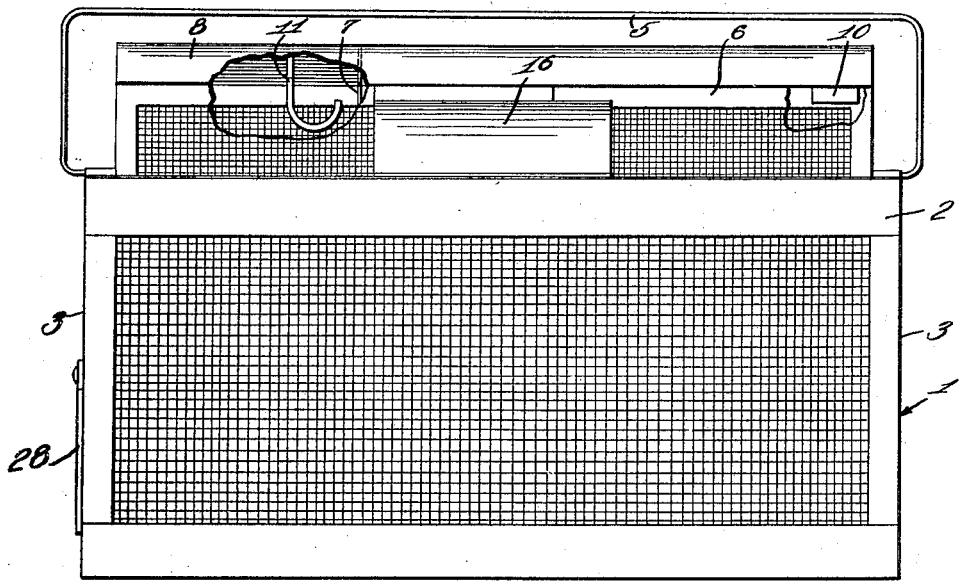
Figure 2:
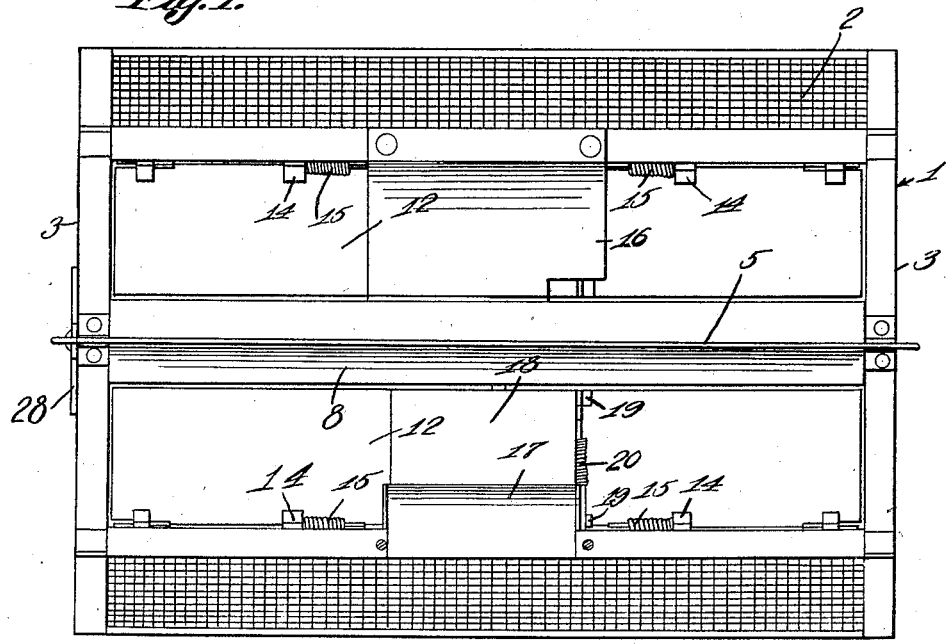
Figure 3:
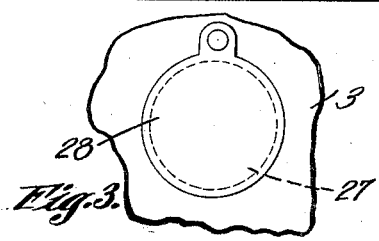
Figure 4:
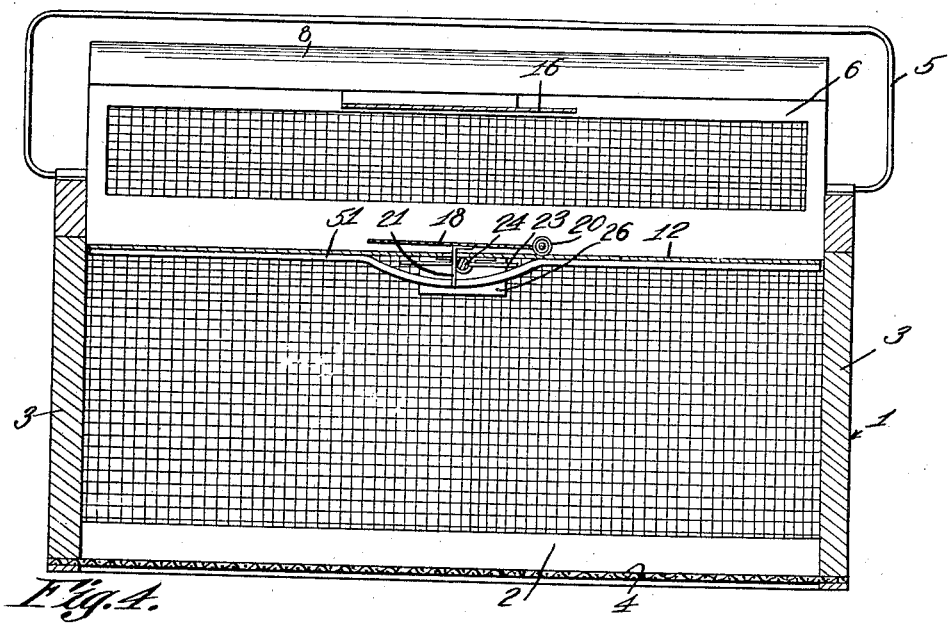
Figure 5:
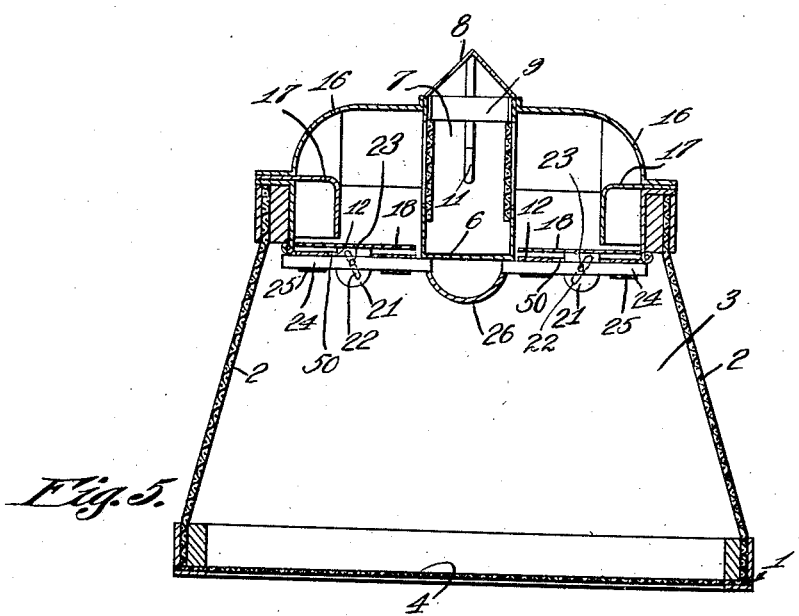

Figure 1 shows in elevation, a device constructed in accordance with the invention; Figure 2 is a top plan; Figure 3 is an elevation showing a portion of one end of the body of the trap; Figure 4 is a longitudinal section taken through one of the swinging platforms and attendant parts; Figure 5 is a transverse section.

In carrying out the invention there is provided a frame including a body 1 which may be made in any desired way. The body 1 comprises sides 2, ends 3 and a bottom 4. One of the ends 3 is provided with an opening, controlled by a pivotally mounted closure 28, the construction being such that the animals, having been trapped, may be taken out through the opening which is controlled by the closure 28. A bail 5 is pivotally assembled with the ends 3 and constitute means whereby the trap may be carried about readily.

A bail receptacle 6 extends between the ends 3 and is located at the top of the trap. The bait receptacle 6 may be provided with any desired number of transverse partitions 7, forming separate compartments for different kinds of bait, the side portions of the bait receptacle 6 being connected by braces 7. A detachable cover 8 rests on the bait receptacle 6 and forms part thereof, the cover being supplied with depending resilient fingers 10, engaged within the bait receptacle 6 and forming means whereby the cover 8 is held removably in place. The cover 8 may be equipped with hooks 11, extended downwardly, and constitutes means whereby a bait may be suspended in the receptacle 6.

Downwardly swinging platforms 12 are located between the sides 2 of the body 1 and the bait receptacle 6, the platforms 12 being connected by hinges 14 to the side portions of the body 1, the hinges comprising springs 15 which tend to swing the platforms 12 upwardly, into the position shown in Figure 5 of the drawings. Guards 16 project inwardly from the sides 2 of the body 1 and overhang the platforms 12 intermediate the ends thereof, the guards being extended inwardly to the bait receptacle 6, as shown in Figure 5. Brackets 17 are mounted on the sides 2 of the body 1 and extend beneath the guards 16.

Trigger plates 18 extend longitudinally of the platforms 12 and are located intermediate the ends of the platforms, the trigger plates being disposed beneath the guards 16. Each trigger plate 18 is attached at one end by a hinge 19 to the corresponding platform 12, the hinges comprising springs 20 which tend to maintain the trigger plates 18 spaced slightly above the platforms 12, as shown in Figure 4. Each trigger plate 18 has an ear 21 extended downwardly through an opening 50 formed in the platform 12. The ear 21 has an inclined cam slot 22 receiving a lateral projection 23 on a latch 24 mounted for longitudinal reciprocation in guides 25 carried by the platforms 12, the latches 25 being adapted to reciprocate transversely of the platforms. At their inner ends, latches 24 are engaged with a keeper 26 carried by the lower portion of the bait receptacle 6.

In practical operation, the animal to be trapped climbs on the platforms 12 and, ultimately, being attracted by the bait, moves on one of the trigger plates 18. Since the trigger plates 18 are overhung by the guards 16, the animal cannot jump off the trigger plates. The brackets 17 tend to crowd the animal inwardly, toward the free inner edges of the platforms 12, and, consequently, the animal will be dumped downwardly into the body 12 when the platforms are released as hereinafter described. When the animal treads on the trigger plate 18, the trigger plate moves downwardly with respect to the platform 12, the cam slot 22 in the ear 21, cooperating with the projection 23 on the latch 24, retracts the latch out of engagement with the keeper 26 whereupon the platform 12 swings downwardly on the hinge 14, the animal being projected downwardly into the body 1 of the trap as aforesaid. As soon as the weight of the animal is off the platform 12, the platform swings upwardly, under the action of the springs 15, into the position shown in Figure 5, the trigger plate 18 rising slightly under the action of the spring 20, into the position shown in Figure 4, the ear 21 and its cam slot 22 advancing the latch 24, through the instrumentality of the projection 23, so that, when the platform 12 is swung upwardly, the latch will engage automatically with the keeper 26, the parts thus being restored to the position shown in Figure 5. If desired, the platforms 12 may be reinforced by longitudinal brace rods 51, as shown in Figure 4.

What is claimed is:—

A trap comprising a body; a platform hinged to the body and having an opening; a latch slidably mounted on the platform and located beneath the platform; a keeper wherewith the latch engages to hold the platform in set position; a trigger hinged to the platform and located above the platform, the trigger having an ear extended through the opening, the latch and the ear having relatively inclined parts which coact to retract the latch with respect to the keeper when the trigger is compressed with respect to the platform; and spring means for raising the trigger plate with respect to the platform, said spring means being spaced from the latch, but serving to advance the latch through the instrumentality of said relatively inclined parts.

In testimony that we claim the foregoing as our own, we have hereto affixed our signatures in the presence of two witnesses.

EDWIN EARL VINING.
RUFUS EUPHRATES CLODFELTER.

Witnesses:
 ERNEST LEE,
 LE ROY LASHELL.